US008055066B2

(12) United States Patent
Xiong et al.

(10) Patent No.: US 8,055,066 B2
(45) Date of Patent: Nov. 8, 2011

(54) APPARATUS, SYSTEM, AND METHOD FOR SKIN TONE DETECTION IN A CMOS IMAGE SENSOR

(75) Inventors: Weihua Xiong, Cupertino, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 833 days.

(21) Appl. No.: 12/103,871

(22) Filed: Apr. 16, 2008

(65) Prior Publication Data

US 2009/0263013 A1 Oct. 22, 2009

(51) Int. Cl.
*G06K 9/00* (2006.01)
(52) U.S. Cl. ......... 382/162; 382/165; 382/167; 382/168
(58) Field of Classification Search .................. 382/162, 382/167, 168, 165, 100, 155, 103, 164; 356/405; 352/45; 348/144, E5.022, E9.056
See application file for complete search history.

(56) References Cited

OTHER PUBLICATIONS

Kleihorst, Richard, et al., "Real Time Skin-Region Detection With a Single-Chip Digital Camera," IEEE, vol. III of III, Oct. 7-10, 2001 International Conference on Image Processing, pp. 306-309.
Lee, Mi-Suen, et al., "Real Time Skin-Tone Detection With a Single-Chip Digital Camera," Philips Research Laboratories 4 pages.
White Paper for NuCORE Chip Set First Deliver 3-CCD Color Quality to 1-CCD Cameras at 50 Megapixels Per Second, Santa Clara, CA, Jul. 26, 2000, 5 pages.

*Primary Examiner* — Anh Hong Do
(74) *Attorney, Agent, or Firm* — Lathrop & Gage LLP

(57) ABSTRACT

An image sensing system provide feature tone detection. A feature tone detection module receives illumination compensated pixel data. To perform feature tone identification the illumination compensated pixel data is transformed to a color space having hue and saturation and then compared against pre-selected ranges of hue and saturation. Noise filtering is performed using an erosion-dilation process. A bit code is used to identify pixels having a specified feature tone, such as a skin tone.

21 Claims, 5 Drawing Sheets

APPARATUS, SYSTEM, AND METHOD FOR SKIN TONE DETECTION IN A CMOS IMAGE SENSOR

FIELD OF THE INVENTION

The present invention is generally related to skin tone detection techniques. More particularly, the present invention is directed towards skin tone detection techniques in CMOS image sensors.

BACKGROUND OF THE INVENTION

There is increasing interest in the detection of human skin tones in digital images. Skin tone detection may be used, for example, to assist in facial detection and body detection. In the prior art various skin tone detection techniques have been implemented using expensive Digital Signal Processors (DSPs) or computers to identify skin tones in digital images using complicated optimal solution mathematical algorithms to identify skin tones and perform various image analysis processes. However, these approaches based on optimal solution image processing algorithms typically require substantial computational resources and are too expensive to be integrated into high-volume consumer products.

There is interest in implementing skin tone detection in digital cameras having a Complementary Metal Oxide Semiconductor (CMOS) image sensor. CMOS image sensors typically generate pixel data in a color space, such as the Red (R), Green (G), and Blue (B) color space. One conventional approach in CMOS image sensors is to convert the RGB color space into a UV chrominance space and then perform skin tone analysis in the UV space. For example, the research paper, "Real Time Skin-Region Detection with a Single-Chip Digital Camera", in *Proc. IEEE Intl. Conf. Image Processing*, Thessaloniki, Greece, October 2001, describes a CMOS image sensor having a massively parallel embedded processor that implements skin tone detection in which R, G, B color values are transformed to U, V chrominance components (a UV color space) to perform skin tone detection.

However, the conventional approach to achieving an integrated skin tone detection capability in a CMOS image sensor has several drawbacks. One problem with UV based skin detection approaches is that it still requires more computing power than desired, due to the need to perform mathematical division operations to transform the RGB space into the UV space. Another problem is that performing skin tone detection in a UV space may make the skin tone detection accuracy dependent on lighting conditions. That is, when the same skin surface is lit with different illuminants the UV components of the captured image will vary, which in turn may cause errors in the skin tone detection algorithm. This is exacerbated by the problems in the prior art in implementing a low-cost noise filtering to eliminate false skin detection.

Therefore in light of the previously described problems what is desired is a new apparatus, system, and method to implement skin tone detection in CMOS image sensors.

SUMMARY OF THE INVENTION

An image sensing system includes a feature tone detection module that receives a copy of illumination compensated pixel data. The copy of the illumination compensated pixel data is transformed to a color space having hue and saturation and then compared against pre-selected ranges of hue and saturation. In one implementation an initial identification of whether a pixel has a particular feature tone is represented by a bit code and noise filtering is performed using an erosion-dilation process. One application of the feature tone detection module is for detecting skin tones.

One embodiment of the invention is a method of detecting feature tones using pixel data generated by a Complementary Metal Oxide Semiconductor (CMOS) image sensing system. The CMOS image sensing system receives illumination compensated pixel data of a captured image in a first color space. Feature tone detection is then performed on a copy of the illumination compensated pixel data. The copy of the illumination compensated pixel data is transformed to a second color space that includes hue and saturation. Each pixel of the captured image is identified as being a feature tone candidate if the pixel has hue within a first range and saturation within a second range. Each illumination compensated pixel in the first color space is then assigned a bit code identifying whether the pixel is a feature tone candidate. In one embodiment the illumination compensated pixel data is white balance corrected pixel data and noise filtering is performed on the feature tone candidates. The noise filtering in one embodiment is performed via an erosion-dilation process.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
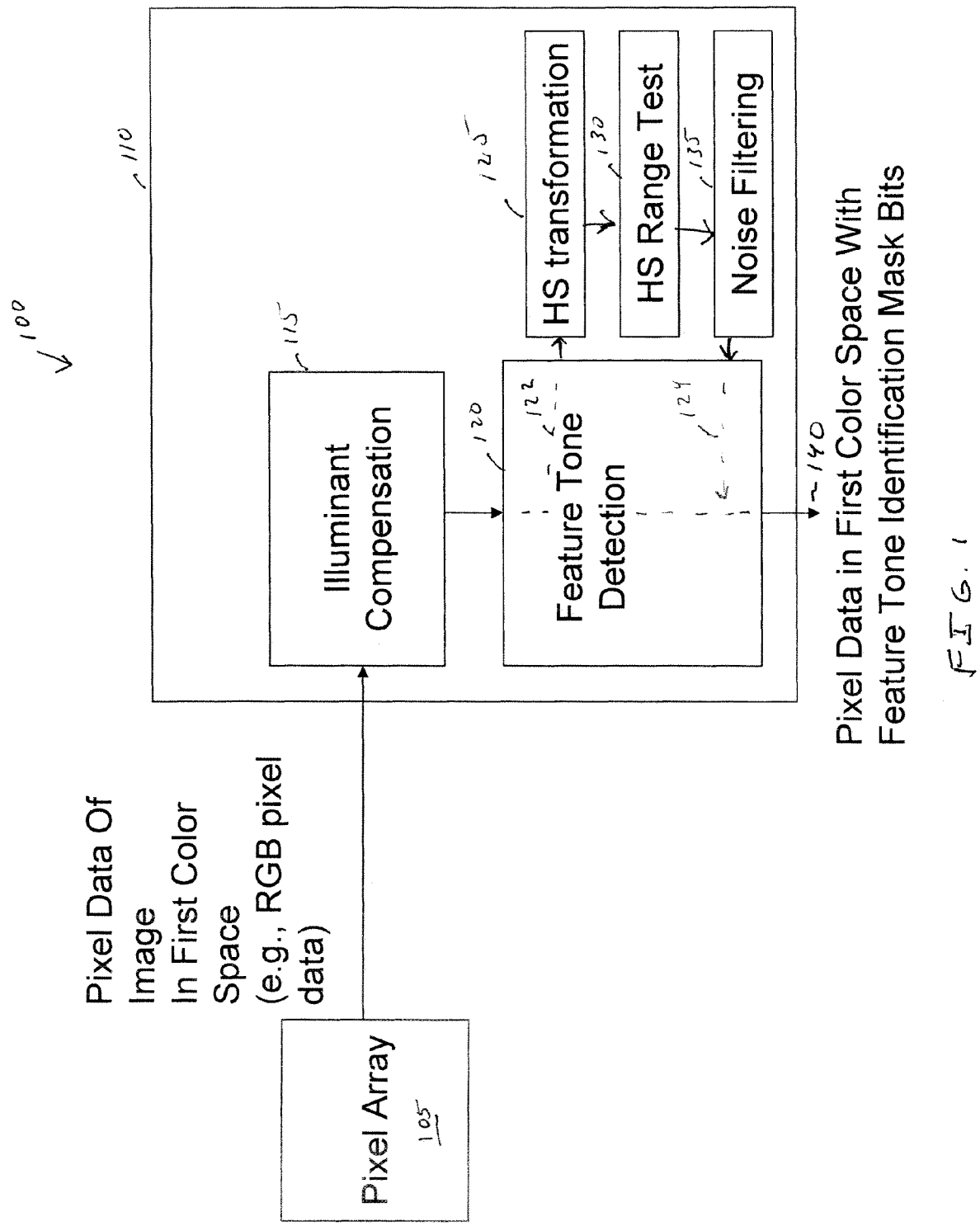
FIG. 1 illustrates an image sensing system for performing feature tone detection in accordance with one embodiment of the present invention.

FIG. 1 is a block diagram of an imaging system 100 in accordance with one embodiment of the present invention. A pixel array 105 generates pixel data in a first color space. As one example, the pixel data may be Red-Green-Blue (RGB) pixel data having a pre-selected number of bits allocated for each pixel to represent color data in each color channel (e.g., 8 bits per color in one implementation). However, it will be understood throughout the following discussion that RGB is merely an exemplary first color space and that other known alternatives to RGB are contemplated.

A captured digital image may be read out from pixel array 105 using conventional techniques, such as a row-by-row line readout. An image processing portion 110 processes the pixel data of a captured image and may include a line buffer memory (not shown) to buffer pixel data for a pre-selected number of lines of pixel data. Image processing portion 110 may be implemented using dedicated hardware and/or software to implement functional blocks. In one embodiment imaging system 100 is implemented using a Complementary Metal Oxide Semiconductor (CMOS) process including a CMOS based pixel array 105 and a CMOS based image processing portion 110.

Image processing portion 110 includes an illuminant compensation module 115 to adjust the raw pixel data to compensate for different lighting conditions. Different light sources have different spectral responses. The human visual system adapts to changing lighting conditions by a process of chromatic adaptation to recognize objects, such as recognizing a white paper as having a white color even when the paper is lit by a range of different illuminants. In a digital camera the raw pixel data is adjusted based on an estimate of the illuminant(s). A white point of the light source is estimated and white balance correction is performed to adjust the colors of the raw pixel data to more closely approximate the response of the human eye.

A feature tone detection module 120 detects features that are correlated to specific tones and outputs mask bits that identify whether individual pixels have the feature tone. The output 140 of the image processing portion is an image having illuminant compensated pixel data with additional feature tone identification mask bits. The feature tone identification mask bits may be used, for example, in subsequent image feature identification. For example, with 10 bit pixel data, 8 bits per pixel can be used for the conventional pixel color data and 1 or 2 bits per pixel used for the feature tone identification mask bits.

In one implementation, the feature tone identification mask bits are embedded in the illumination compensate pixel data (in the first color space). For example, a single additional bit can be used to provide a yes/no indication that a pixel has a specific feature tone; more generally a bit code may be embedded with pixel data to identify whether a pixel has a specific feature from a selection of features. For example, a two-bit code may be used to identify three different feature tones and a null result. An illustrative example of a type of feature tone detection is the detection of human skin tones, although more generally other types of characteristic feature tones may be detected depending on calibration parameters.

As indicated by arrows 122 and 124, feature tone detection is performed on a copy of the pixel data in a second color space that includes hue and saturation, such as the Hue-Saturation-Value (HSV) space. The HSV space is also sometimes described using different terms such as HSI (hue, saturation, and intensity) or HSB (hue, saturation, and brightness). The HSV color model is modeled as a hexcone, which is a subset of a polar coordinate system. Hue is the dominant wavelength or color and has a range of 0 to 360 degrees. Hue describes the shade of a color and where it fits in a color spectrum. Saturation is the purity of color (i.e., how pure the hue is with respect to a white reference) and has a value between 0 and 1. A pure red that has no white has a saturation value of 1.0, i.e., a vibrant red color. However, if some white is added to a red color, the hue is still red (the dominant color) but the color becomes more pink. Value is the brightness of color, i.e., where an individual color lies along a lightness-darkness axis having a range between 0 and 1. HSV is considered a perceptually intuitive color space in that it provides information on the what type of color an object has, how vibrant the object is, and how light or dark an object is. The human eye can differentiate approximately 128 different hues and 130 different saturations. Certain types of feature tones, such as skin tones, can be characterized as having hue and saturation within a specified range even though the value (brightness) may vary.

While HSV is one example of a color space based on hue and saturation there are other known color spaces based on hue and saturation. For example, the Hue-Saturation-Lightness (HSL) color space is another well-known color space that includes hue and saturation.

The feature tone detection module 120 includes a color space transformation module 125 to transform a copy of the illumination compensated pixel data into the second color space having hue and saturation. The transformation is preferably selected to not require the calculation of inverse trigonometric functions and is preferably organized to minimize (or eliminate) division operations, as inverse trigonometric functions and division operations are expensive to provide in a CMOS hardware implementation. An initial feature tone identification module 130 performs a comparison of the hue and saturation of each pixel against pre-defined ranges for the feature of interest. In one implementation, calibration data is used to define ranges for a particular feature tone. For example, for skin tone detection calibration data is used to define a range of Hue ($[H_{low\ limit}, H_{high\ limit}]$) and a range of saturation ($[S_{low\ limit}, S_{high\ limit}]$) to identify a skin tone. As other examples, calibration data may be used to define ranges of hue and saturation for other feature tones of interest, such as (green) grass tones or (blue) sky tones.

Pixels that have hue and saturation within the pre-defined range are identified as being feature tone candidates. In one implementation a bit code (e.g., 1 or 2 bits) is used to indicate that a pixel is a feature tone candidate. However, there are various sources of potential error in this initial identification of feature tone candidates. One source of noise is sensor noise. Additionally, there may be other potential sources of error that lead to a misidentification. For example, in the case of human skin, the condition of the skin (e.g., dirty skin, skin cuts, etc.) may result in some errors in properly identifying individual pixels as having a human skin tone. Conversely, there may also be a false identification of individual (non-skin) pixels as having a human skin tone.

In one embodiment a noise filtering module 135 filters windows of pixels to reduce the number of misidentified pixels. For a variety of applications it is a good approximation to assume that a feature of interest for which feature tone detection is being performed is likely to have a contiguous region of pixels. That is, the feature of interest is unlikely to have voids below some criteria (such as single pixel voids) and is also unlikely to be of interest if it is an isolated island of pixels below a certain minimum number of pixels (e.g., single pixel regions). Consequently, in one embodiment noise filtering module 135 performs a process to correct the identification of pixels.

Figure 2A:
FIGS. 2A and 2B illustrate noise filtering based on an erosion-dilation process to correct feature tone identification in accordance with one embodiment of the present invention.
Figure 2B:

FIGS. 2A and 2B illustrate an exemplary noise filtering process based on erosion (FIG. 2A) and dilation (FIG. 2B). In these examples a binary bit code uses a "1" to indicate identification of a feature tone within a pixel and a "0" indicates that the feature tone was not detected in the pixel. Erosion is a process in which a pixel is assigned a minimum value of other pixels within a selected neighborhood. Dilation is a process in which a pixel is assigned a maximum value of other pixels within a selected neighborhood. Rules are defined to trigger erosion and dilation. For the case of a pixel having a binary code, the simplest rule for triggering erosion is that if any of the other pixels in a window have a binary value of 0, an output pixel is assigned a binary value of 0. The simplest rule for triggering dilation for a binary bit code is that if any other pixels in a window have a binary value of 1, the output pixel is assigned a binary value of 1. More generally, more complex rules can be defined to trigger erosion and dilation. For example, empirical data may be used to select a window size and threshold rules to trigger erosion and dilation that provide optimum noise filtering for a particular feature tone identification process.

In the examples of FIGS. 2A and 2B, the initial identification of a pixel is compared with the overall detection results inside an operation window having a window width, w. Noise is filtered by selecting the window width and a threshold average pixel bit code value to trigger erosion and dilation that results in the correction of isolated islands and/or voids in identification. In the examples of FIGS. 2A and 2B the window has a size corresponding to identification results for seven pixels. The detection results (binary bit code values) from a group of pixels are evaluated within the window and each pixel is compared with the overall detection results of the window. FIG. 2A illustrates an erosion process. In the example of FIG. 2A, an individual pixel in the center of the window is initially incorrectly identified as having the feature tone and therefore assigned a binary value of "1". However, the neighboring pixels in the window are initially assigned a binary "0." In this case, the average bit code value within the window is low (since only one individual pixel has a bit code with a binary 1). Consequently, the initial identification of the middle pixel is likely in error and the correction rules result in the bit code error being corrected via erosion. FIG. 2B illustrates a dilation process. In the example of FIG. 2B, the initial identification results in each pixel in the window being assigned a binary 1 except for a gap in the third pixel, which is initially assigned a binary 0. In this example the average value over the window is high. Consequently, the bit code value of the third pixel is increased to a binary 1.

Implementing noise filtering via an erosion-dilation process has the benefit that it improves feature tone detection accuracy while also being compatible with a cost-effective CMOS implementation. In particular, erosion-dilation processes may be implemented using comparatively simple binary operations and are thus compatible with a cost-effective CMOS hardware implementation.

Figure 3:
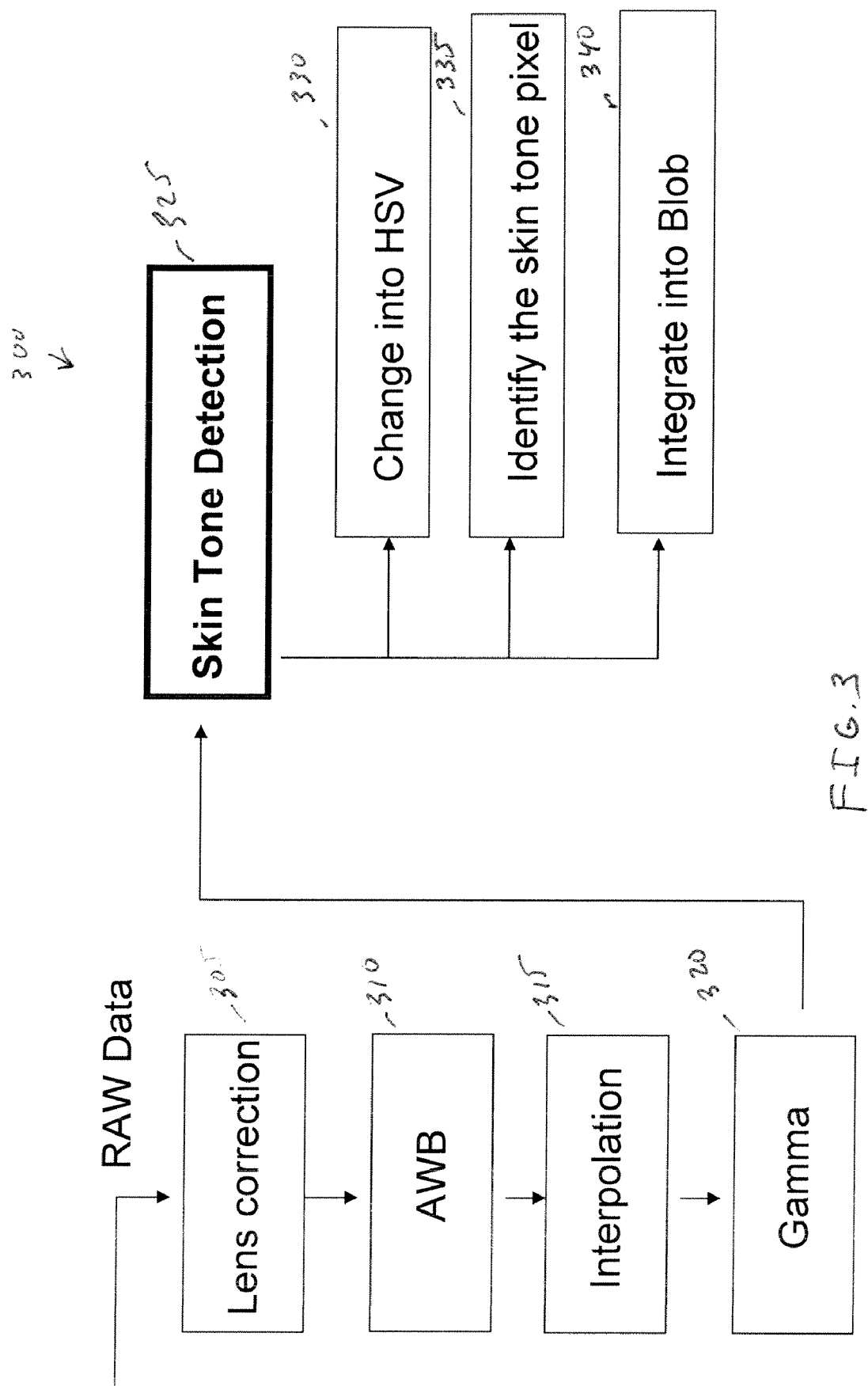
FIG. 3 illustrates an image processing system performing skin tone detection in accordance with one embodiment of the present invention.

FIG. 3 illustrates an image processing system 300 for performing skin tone detection in accordance with one embodiment of the present invention. An image processing pipeline receives raw pixel data captured by a pixel array (not shown). An initial set of luminance and chromatic corrections is made to the raw pixel data to generate illumination compensated pixel data in a first color space, such as RGB. An exemplary set of modules to perform luminance and chromatic correction to the raw pixel data includes a lens correction module 305 to correct for lens shading, an Auto-White-Balance (AWB) module 310 to perform white balance correction, an interpolation module 315 to interpolate color values, and a gamma correction module 320 to perform gamma correction. The skin tone detection module 325 has a first sub-module 330 to change the color space of a copy of the pixel data into the HSV color space, a second sub-module 335 to identify skin tones based on ranges of hue and saturation, and a third sub-module 340 to perform de-noising and integrate skin tone identification bit masks into a blob of illumination compensated pixel data. In one embodiment the output of the image processing system 300 is pixel data (in the first color space) in which an individual pixel has additional mask bits indicating whether the pixel is identified as having a skin tone.

Figure 4:
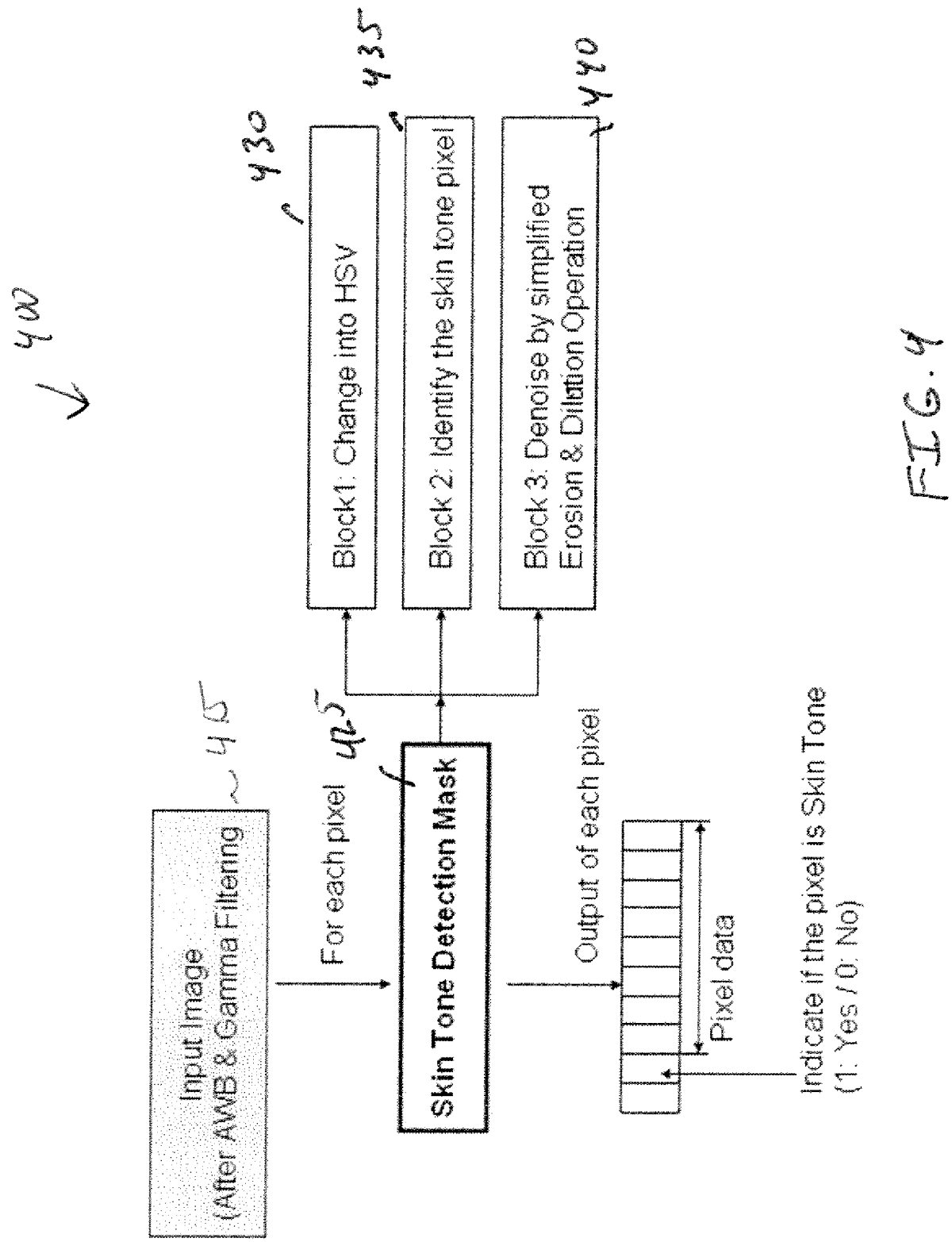
FIG. 4 illustrates an image processing system performing skin tone detection in accordance with one embodiment of the present invention.

FIG. 4 illustrates an embodiment of an image processing system 400 for performing skin tone detection that utilizes erosion and dilation for noise filtering. In FIG. 4, skin tone detection mask module 425 receives a copy of the illumination compensated pixel data 415 (e.g., after AWB and Gamma filtering) in a first color space (e.g., RGB). A first sub-module 430 changes the pixel data into the HSV color space for the purposes of skin tone detection. A second sub-module 435 performs an initial identification of skin tone pixels based on the range of hue and saturation of the pixel. If the hue and saturation are within a pre-defined range, the pixel is initially identified as being a skin tone pixel and assigned a first binary value (e.g., "1"); otherwise the pixel is assigned a different binary value (e.g., "0"). A third sub-module 440 performs de-noising by an erosion-dilation process similar to that previously described in regards to FIGS. 2A and 2B. The output of the image processing system is an additional mask bit indicating whether the pixel is a skin tone pixel. In one embodiment, each pixel has a mask bit assigned to it to indicate whether the pixel was identified as having a skin tone. For example, with 8 bit pixel data an extra bit can be assigned as a skin tone identification bit. Consequently, every individual pixel carries its own skin tone identification mask bit (or bits). However, it will also be understood that the mask bits of an image could be separately extracted, if desired, for use in processing an image.

Figure 5:
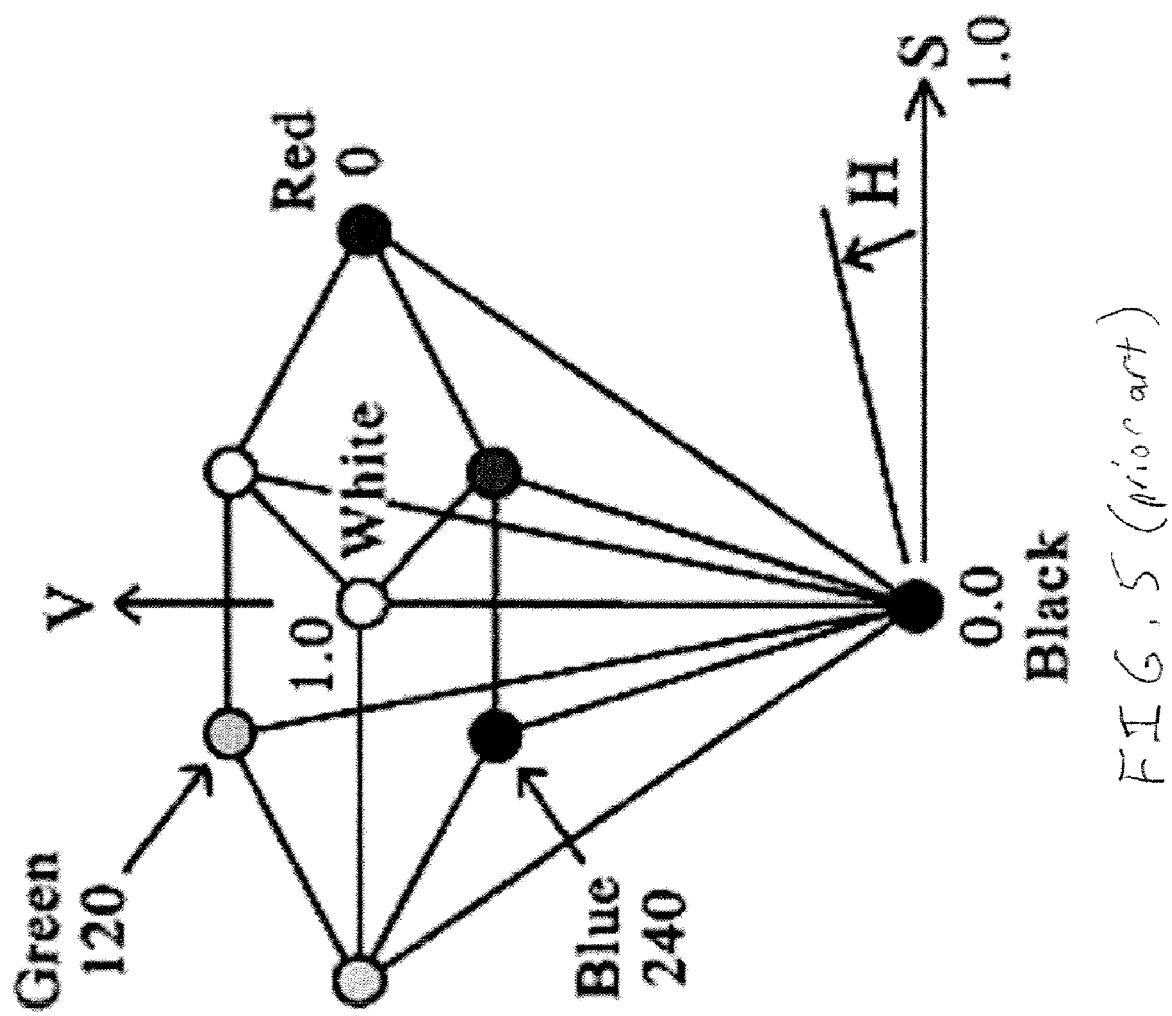
FIG. 5 illustrates aspects of the HSV color space in accordance with the prior art.

Additional details of a transformation process for converting the color space of the pixel data into the HSV space to perform feature tone detection will now be described. FIG. 5 illustrates a conventional hexcone model of the HSV color space. In the HSV color space changing the hue (rotation about the axis) corresponds to a change in color. As the hue varies the corresponding colors vary from red through yellow, green, cyan, blue, and magenta. For example, red has a value of zero degrees, green a value of one hundred and twenty degrees, and blue has a value of two-hundred and forty degrees. Thus, selecting a range of hue corresponds to selecting a range of colors. Selecting a range of saturation corresponds to selecting a range of spectral purity.

There are various conversion algorithms to convert RGB pixel data to HSV. Some of these algorithms are based on a polar coordinate conversion and require computing inverse trigonometric functions, such as arctangent calculations, using a conic representation of HSV. Inverse trigonometric functions require significant computing resources and are thus undesirable, particularly in a CMOS hardware implementation. As an alternative, there are conversion algorithms based on computing, in different zones of a hexcone, the minimum (min) of (r, g, b), the maximum (max) of (r, g, b), and a delta, which is max-min. In this model V is the max of (r, g, b) and S is delta/V, where "/" is a division operation. Hue is then defined in three different zones depending on the dominant color. If red is the max (corresponding to a hue between yellow and magenta, hue=(g−b)/delta. If green is the max (corresponding to a hue between cyan and yellow), hue=2+(b−r)/delta. Otherwise, for the hue being between magenta and cyan, hue=4+(r−g)/delta. A drawback of this conversion algorithm is that it still requires several division operations, which are undesirable in a CMOS hardware implementation. However, note that the division operations are unnecessary to perform a test that the hue and saturation fall within a pre-defined range. For example, consider H=(g−b)/delta. Since the objective is to determine if H is within a desired range, this can be converted to $H_{low-limit} < (g-b)/delta < H_{high-limit}$ which in turn can be converted to the comparison equation by multiplying by delta: $delta*H_{low-limit} < (g-b) < delta*H_{high-limit}$.

Embodiments of the present invention have a number of advantages. Performing skin tone detection after illumination compensation (e.g., after AWB) makes the detection robust to changes in lighting conditions. In one embodiment, a modified RGB to HSV process for feature tone detection eliminates a division operation, which is desirable for a CMOS hardware implementation. In one embodiment, a noise filtering process utilizes an erosion-dilation process to improve accuracy. These features facilitate a simple, reliable, and low cost implementation in a CMOS based image sensing system. Additionally, embodiments of present invention can be applied to the detection of other types of feature tones besides skin tone.

While examples have been provided in which the first color space is an RGB color space, it will be understood that this is merely an exemplary first color space. In particular, it will be understood that it is contemplated that the first color space may comprise other conventional color spaces known in the art.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of detecting feature tones using pixel data generated by an image sensing system, comprising:
generating illumination compensated pixel data from original pixel data of an image captured from the image sensing system in a first color space; and
performing feature tone detection by a processor, including:
transforming a copy of the illumination compensated pixel data of the captured image to a second color space that includes hue and saturation;
identifying each pixel within the captured image as being a feature tone candidate if the pixel has hue within a first range and saturation within a second range; and
assigning each illumination compensated pixel in the first color space a bit code identifying whether the pixel is a feature tone candidate.

2. The method of claim 1, wherein the illumination compensated pixel data is white balance corrected.

3. The method of claim 1, wherein said first color space is a Red-Green-Blue (RGB) color space.

4. The method of claim 1, wherein said second color space is a Hue-Saturation-Value (HSV) color space.

5. The method of claim 1, further comprising filtering noise by evaluating the bit codes of groups of pixels within a window of contiguous neighboring pixels by an erosion-dilation process to correct the identification of individual pixels within the window.

6. The method of claim 5, wherein the identification of a pixel is corrected based on comparing the bit value associated with the identification of the pixel against an average bit value within the window to trigger the erosion-dilation process.

7. The method of claim 1, wherein the feature tone is a skin tone.

8. The method of claim 1, wherein feature tone detection is performed by transforming the illumination compensated pixel data of the captured image to a second color space that includes hue and saturation utilizing a color space transform having division operations replaced with multiplication operation to reduce computational effort in hardware.

9. A method of identifying skin tones using pixel data generated by an image sensing system, comprising:
generating illumination compensated pixel data of an image that is captured from the image sensing system and has been white balance corrected, the illumination compensated pixel data being in a first color space;
performing skin tone detection by a processor, including:
converting a copy of the illumination compensated pixel data of the captured image to a second color space having hue and saturation;
identifying a pixel within the captured image as being a skin tone candidate if the pixel has a hue within a first range and a saturation within a second range;
performing noise filtering of skin tone candidates to correct individual errors in pixel identification; and
outputting a detection mask indicating whether individual pixels of the captured image correspond to a skin tone.

10. The method of claim 9, wherein said detection mask corresponds to a bit code embedded in individual pixels of the illumination compensated pixel data in said first color space.

11. The method of claim 10, wherein said performing noise filtering includes evaluating groups of pixels within a window of neighboring pixels by an erosion-dilation process.

12. The method of claim 9, wherein the first color space is a Red-Green-Blue (RGB) color space and the second color space is a Hue-Saturation-Value (HSV) color space.

13. The method of claim 9, wherein said converting comprises a RGB to HSV transformation structured to eliminate division operations and trigonometric calculations in the calculation of Hue.

14. An image sensing system, comprising:
an image processing pipeline receiving raw pixel data of a captured digital image and performing illumination compensation of the raw pixel data to generate illumination compensated pixel data in a first color space;
a skin tone detection mask module receiving a copy of the illumination compensated pixel data from the image processing pipeline and for each pixel generating a bit code identifying whether the pixel is a skin tone pixel, the skin tone detection mask module including:

a first sub-module to covert illumination compensated pixel data in the first color space into a second color space that includes hue and saturation; and a second sub-module to make an initial identification in the second color space whether a pixel is a skin tone pixel if the pixel has a hue within a first range and a saturation within a second range.

15. The image sensing system of claim 14, wherein the image processing pipeline includes a white balance correction module.

16. The image sensing system of claim 14, wherein the second color space is a hue-saturation-value color space.

17. The image sensing system of claim 14, further comprising a third sub-module performing noise filtering by an erosion-dilation process that evaluates the bit codes of groups of pixels within a window of contiguous neighboring pixels.

18. The image sensing system of claim 17, wherein a correction of the identification of a pixel is based on a comparison of the bit value associated with the identification of the pixel against an average bit value within the window to trigger the erosion-dilation process.

19. The image sensing system of claim 14, wherein said bit code comprises at least one bit embedded with each illumination compensated pixel.

20. A CMOS image sensing system providing skin tone detection in a variety of lighting conditions, comprising:

an image processing pipeline receiving raw pixel data and performing illumination compensation of the raw pixel data that includes white balance correction to generate illumination compensated pixels in a first color space; and a skin tone detection mask module receiving as an input a copy of the output of the image processing pipeline and generating for each illumination compensated pixel a bit code identifying whether the illumination compensated pixel is a skin tone pixel with the bit code being embedded in each output illumination compensated pixel, the skin tone detection mask module including:

a first sub-module to covert illumination compensated pixel data in the first color space into a second color space that includes hue and saturation;

a second sub-module to make an initial identification in the second color space whether a pixel is a skin tone pixel based on whether the pixel has hue within a first range and saturation within a second range; and a third sub-module to perform noise filtering by an erosion-dilation process in which the bit codes of individual pixels are corrected based on a comparison of the bit value associated with the identification of the pixel against an average bit value within a window of pixels.

21. The CMOS image sensing system of claim 20, wherein skin tone detection mask module converts the illumination compensated pixel data of the captured image to the second color space that includes hue and saturation by utilizing a color space transform having division operations replaced with multiplication operation to reduce computational effort in CMOS hardware.

* * * * *